United States Patent [19]
Jahnke

[11] Patent Number: 6,033,456
[45] Date of Patent: *Mar. 7, 2000

[54] INTEGRATION OF PARTIAL OXIDATION PROCESS AND DIRECT REDUCTION REACTION PROCESS

[75] Inventor: Frederick C. Jahnke, Rye, N.Y.

[73] Assignee: Texaco Inc., White Plains, N.Y.

[ * ] Notice: This patent is subject to a terminal disclaimer.

[21] Appl. No.: 09/019,870

[22] Filed: Feb. 6, 1998

Related U.S. Application Data

[63] Continuation of application No. 08/656,216, filed as application No. PCT/US94/12022, Oct. 11, 1994, Pat. No. 5,744,067.

[51] Int. Cl.[7] .................................................. C21B 13/00
[52] U.S. Cl. ................................. 75/505; 75/958
[58] Field of Search ........................ 75/958, 505

[56] References Cited

U.S. PATENT DOCUMENTS

| | | | |
|---|---|---|---|
| 5,358,696 | 10/1994 | Jahnke | 252/373 |
| 5,531,424 | 7/1996 | Whipp | 266/172 |
| 5,744,067 | 4/1998 | Jahnke | 252/373 |

*Primary Examiner*—Melvyn Andrews
*Attorney, Agent, or Firm*—Harold J. Delhommer; Rodman & Rodman

[57] ABSTRACT

The present invention relates to an integrated process and apparatus for supplying at least a portion of, or substantially all, or all of the reducing gas feedstock to a reduction reactor, such as a reactor for the direct reduction of iron, wherein the reducing gas contacts a feed material at a mean operating gas pressure and effects reduction of the feed material to provide a reduced product. The integrated process includes the production of a hydrogen-rich gas by the partial oxidation of a hydrocarbonaceous feedstock to produce a hydrogen-rich gas, which can also be referred to as a synthesis gas or syngas. The synthesis gas is at a pressure substantially greater than the mean operating gas pressure in the reduction reactor. The synthesis gas is expanded to lower its pressure to substantially the mean operating gas pressure in the DRI reduction reactor to thereby form the reducing gas feedstock at the pressure conditions used for the DRI reaction. The lower pressure reducing gas mixture generated by the expansion is introduced into the DRI reactor as part or all of the reducing gas requirement for the direct reduction of iron.

7 Claims, 4 Drawing Sheets

INTEGRATION OF PARTIAL OXIDATION PROCESS AND DIRECT REDUCTION REACTION PROCESS

This application is a continuation-in-part of application Ser. No. 08/656,216 filed May 21, 1996, now U.S. Pat. No. 5,744,067 which is based on International PCT Application PCT/US94/12022 which claims the priority of application Ser. No. 08/159,610 filed Dec. 1, 1993 and now U.S. Pat. No. 5,358,696.

BACKGROUND OF THE INVENTION

1. Field of the Invention

This invention relates to the production of hydrogen-rich gas by the partial oxidation of a water saturated gaseous hydrocarbonaceous fuel or a mixture of water saturated gaseous hydrocarbonaceous fuel and a liquid hydrocarbonaceous fuel.

This invention also relates to the use of at least a portion of the hydrogen-rich gas or synthesis gas produced during a partial oxidation gasification process as the feedstock in a process for the direct reduction of iron, also referred to as the "DRI" process.

2. Description of the Prior Art

The production of hydrogen-rich gas by the partial oxidation of a liquid hydrocarbonaceous feed or a pumpable slurry of solid carbonaceous feed to produce a raw feed gas which is cleaned and purified to produce a product gas comprising about 20 to 60 mole % hydrogen is disclosed in coassigned U.S. Pat. No. 4,338,292. In coassigned U.S. Pat. No. 4,021,366, the process gas stream from the partial oxidation of a liquid hydrocarbon material or a slurry of solid carbonaceous feed is cooled, scrubbed, and water-gas shifted in a bed of low temperature catalyst followed by a bed of high temperature catalyst. In coassigned U.S. Pat. No. 5,152,976, refinery offgas is partially oxidized.

Partial oxidation gasification processes are most effective when operated at relatively high pressures, generally greater than 20 atmospheres. As used herein, a partial oxidation reactor can also be referred to as a "gasification reactor," or simply a "gasifier" and these terms are often used equivalently and interchangeably.

The feedstock for a partial oxidation reaction is usually a hydrocarbonaceous material, that is, one or more materials, generally organic, which provide a source of hydrogen and carbon for the gasification reaction. The hydrocarbonaceous material can be in a gaseous, liquid or solid state, or in a combination as desired, for example, a solid-liquid composition in a fluidized state. Petroleum based feedstocks include petroleum coke, coal residual oils and byproducts from heavy crude oils. The coal or coke can be in a finely divided state. Waste plastic materials can also be used as the feedstock.

Many uses for the syngas produced from the partial oxidation reaction are at relatively lower pressures. Therefore, expansion of the high pressure syngas across a power recovery machine to obtain a syngas at reduced pressure is often employed. This type of expansion is often used as a means for generating electricity. The power generation step is not 100% efficient and some energy is lost in converting the energy to electricity. The electricity generated in such an expansion process requires step up transformers, additional electrical switchgear, and a use for the electricity.

The DRI process can use syngas as a feedstock if it is fed to the reaction chamber at a relatively low pressure, typically less than about 5 atmospheres for a moving bed reactor, and less than about 15 atmospheres for a fluidized bed reactor. The DRI offgas is cooled, compressed, sent to a carbon dioxide removal step, and then mixed with fresh syngas feed and recycled to the DRI process. The recycle compressor is a large energy user and often uses an electrically driven motor. This electrically driven motor is not 100% efficient and some energy is lost in converting electricity to shaft power. Use of an electrical motor requires step down transformers, additional electrical switchgear, and a source of electricity. Alternately, a steam driver can be used with similar energy losses and supporting equipment.

The operation of gasifiers at relatively high pressures in power generation systems, for example, the integrated gasification combined cycle (IGCC) system is disclosed in U.S. Pat. Nos. 5,117,623 and 5,345,756, wherein these systems are coupled with expanders, gas turbines and steam turbines for power generation. U.S. Pat. Nos. 5,531,424 and 5,370,727 disclose processes for the direct reduction of iron.

SUMMARY OF THE INVENTION

The present invention relates to an integrated process and apparatus for supplying at least a portion of, or substantially all, or all of the reducing gas feedstock to a reduction reactor, such as a reactor for the direct reduction of iron, wherein the reducing gas contacts a feed material at a mean operating gas pressure and effects reduction of the feed material to provide a reduced product. The integrated process includes the production of a hydrogen-rich gas by the partial oxidation of a hydrocarbonaceous feedstock to produce a hydrogen-rich gas, which can also be referred to as a synthesis gas or syngas. The synthesis gas is at a pressure substantially greater than the mean operating gas pressure in the direct reduction reactor. The synthesis gas is expanded to lower its pressure to substantially the mean operating gas pressure in the DRI reduction reactor to thereby form the reducing gas feedstock at the pressure conditions used for the DRI reaction. The lower pressure reducing gas mixture generated by the expansion is introduced into the DRI reactor as part or all of the reducing gas requirement for the direct reduction of iron.

DESCRIPTION OF THE DRAWINGS

In the drawings.

Corresponding reference numbers in FIGS. 2, 3 and 4 indicate corresponding parts and process streams.

DESCRIPTION OF THE PREFERRED EMBODIMENTS

Figure 1:
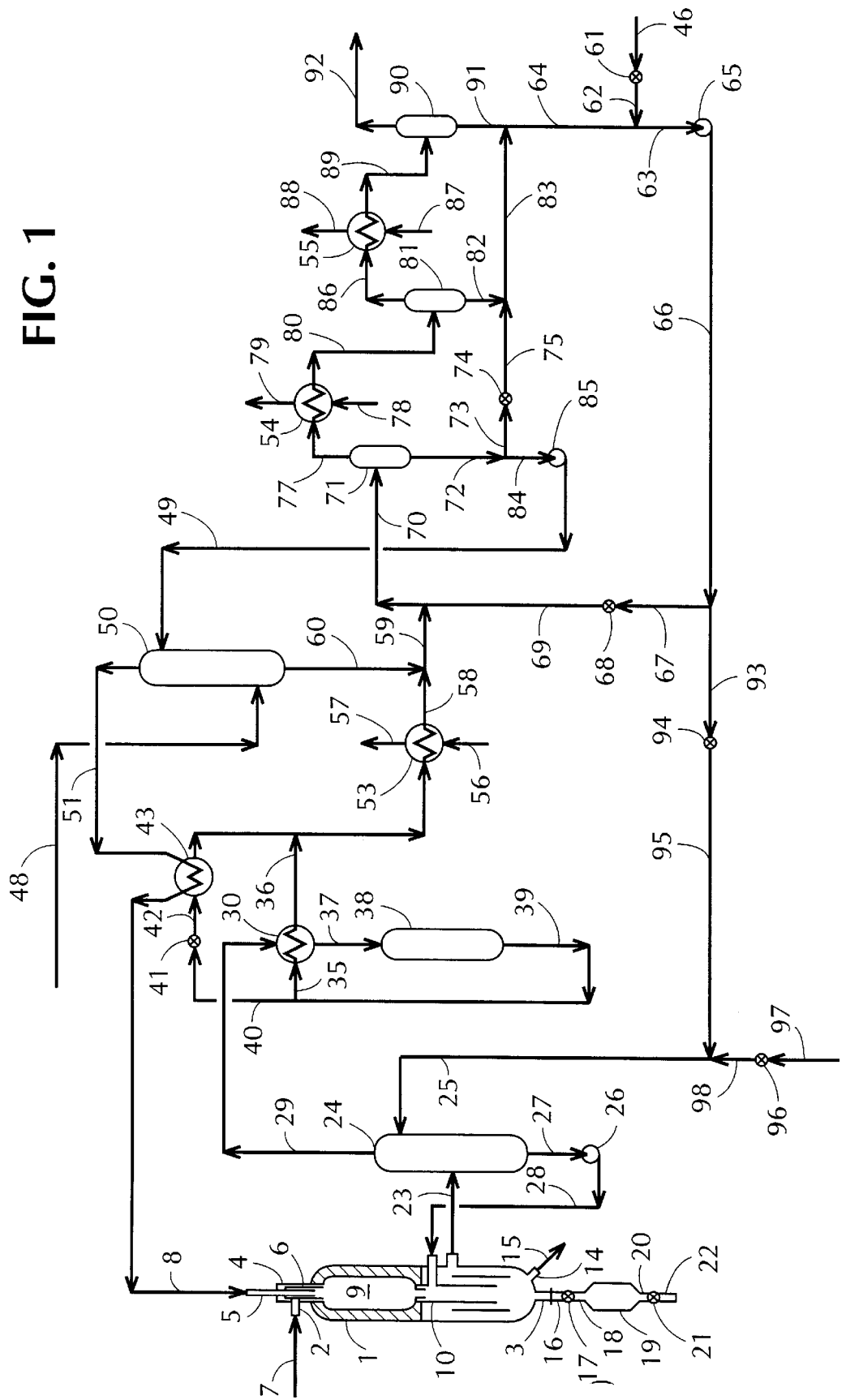
FIG. 1 is a simplified schematic drawing of a gasification process.

A hydrogen-rich gas or synthesis gas can be produced by the partial oxidation of a saturated gaseous hydrocarbonaceous fuel or a mixture of saturated gaseous hydrocarbonaceous fuel and a liquid hydrocarbonaceous fuel in a gas generator. In the process, a saturated gaseous hydrocarbonaceous fuel from a subsequent fuel gas saturator can be preheated by indirect heat exchange with a portion of shifted process gas from a catalytic water-gas direct shift conversion zone and reacted in the partial oxidation gas generator. The process gas stream from the noncatalytic partial oxidation gas generator is quench cooled and scrubbed with water and preheated by indirect heat exchange with a second portion of the process gas stream from the shift conversion zone prior to catalytically reacting the CO and $H_2O$ in the process gas stream in the shift conversion zone to increase its $H_2$ content. The shifted process gas stream is cooled and dewatered to produce shift condensate which is used to saturate the aforesaid preheated gaseous hydrocarbonaceous fuel feedstream to the partial oxidation gas generator.

More specifically, a raw process gas stream, substantially comprising $H_2$, CO, $CO_2$, $H_2O$, entrained particulate matter comprising particulate carbon and ash; and at least one material from the group $N_2$, Ar, COS, $H_2S$, $CH_4$, and $NH_3$ is produced by partial oxidation of a gaseous hydrocarbonaceous fuel or a mixture of a gaseous and liquid hydrocarbonaceous fuel with oxygen, air or oxygen enriched air, in the presence of a temperature moderator, in the reaction zone of a noncatalytic partial oxidation gas generator. The $H_2O$/fuel weight ratio in the reaction zone is in the range of about 0.1 to 5, and preferably about 0.2 to 0.7. The atomic ratio of free oxygen to carbon in the fuel (O/C ratio), is in the range of about 0.6 to 1.6, and preferably about 0.8 to 1.4. The reaction time is in the range of about 0.1 to 50 seconds, such as about 2 to 6 seconds.

The raw fuel gas generator comprises a vertical cylindrically shaped steel pressure vessel lined with refractory, such as shown in coassigned U.S. Pat. No. 2,809,104, which is incorporated herein by reference. A typical quench drum is also shown in said patent.

The fuel feed mixture to the partial oxidation gas generator has a minimum C/H weight ratio of 3.3. A wide range of combustible gaseous hydrocarbonaceous fuels or gaseous and liquid hydrocarbonaceous fuels may be reacted in the gas generator with substantially pure oxygen gas, in the presence of a temperature moderating gas, to produce the raw process gas stream.

Gaseous hydrocarbonaceous fuels that may be burned in the partial oxidation gasifier alone or along with the liquid hydrocarbonaceous fuel includes refinery off-gas, mixtures of $C_1$–$C_4$ hydrocarbonaceous gases, and waste carbon-containing gases from chemical processes. The term "refinery offgas" as used herein refers to the various gas streams which are generated by different units in a petroleum refinery, such as gas produced from the fluid catalytic cracker (FCC) unit, delayed and fluidized coking units, catalytic reforming unit, and the hydrotreating unit. Refinery offgas generally contains saturated and unsaturated hydrocarbons and other impurities, such as organic sulphur, nitrogen species, and inorganic agents including $H_2S$, COS, $SO_x$, $NH_3$, HCN, and arsine. The gaseous hydrocarbonaceous fuel comprises a plurality of gaseous components selected from the group consisting of $H_2$, $N_2$, $O_2$, RSH, $CH_4$, $C_2H_4$, $C_2H_6$, $C_3H_6$, $C_3H_8$, $C_4H_8$, $C_4H_{10}$, $C_5H_{10}$, $C_5H_{12}$, CO, $CO_2$, and $H_2O$.

The term liquid hydrocarbonaceous fuel as used herein to describe various suitable feedstocks is intended to include pumpable liquid hydrocarbon materials and pumpable liquid slurries of solid carbonaceous materials, and mixtures thereof.

The liquid hydrocarbonaceous feed may be at room temperature, or it may be preheated to a temperature up to as high as about 600° F. to 1200° F. but preferably below its cracking temperature. The liquid hydrocarbonaceous feed may be introduced into the gas-generator burner in liquid phase or in a vaporized mixture with the temperature moderator.

The need for a temperature moderator to control the temperature in the reaction zone of the gas generator depends in general on the carbon-to-hydrogen ratios of the feedstock and the oxygen content of the oxidant stream. A temperature moderator is used with liquid hydrocarbon fuels with substantially pure oxygen. Steam is the preferred temperature moderator. Steam may be introduced as a temperature moderator in admixture with either or both reactant streams. Alternatively, the temperature moderator may be introduced into the reaction zone of the gas generator by way of a separate conduit in the burner. Other temperature moderators include water, $CO_2$-rich gas, nitrogen, and recycled synthesis gas.

The term substantially pure oxygen gas or oxygen gas as used herein means greater than about 90% mole oxygen (the remainder usually comprising $N_2$ and rare gases). The stream of oxygen gas may be introduced into the reaction zone by way of the partial-oxidation burner at a temperature in the range of about ambient to 900° F.

All pressures referred to herein are gauge pressures rather than absolute pressures, unless otherwise indicated.

A conventional air separation unit (ASU) is used to separate air into separate streams of substantially pure oxygen gas and nitrogen gas. The stream of oxygen gas from the ASU at a temperature in the range of about ambient to 900° F. is introduced into the reaction zone of the partial oxidation gas generator by way of one or more passages in an annulus-type burner. In one embodiment, steam as the temperature moderator is introduced into the reaction zone of the gasifier in admixture with the stream of oxygen gas.

Before being burned, the gaseous hydrocarbonaceous fuel feed stream in the subject process is saturated by direct contact with shift condensate, also referred to herein as process condensate or condensate in the process gas stream after the water-gas shift reaction, and make-up water in a saturator. Advantageously, by saturating the fuel gas, there are substantial reductions in the atomic ratio O/C in the partial oxidation gasifier, the quantity of soot make, and the required amount of temperature moderator. The efficiency of the process is thereby increased. Any conventional gas-liquid direct contacting chamber may be used as the saturator, including conventional columns with trays and packing. Direct contact minimizes the temperature approach between the water and the gas, thereby maximizing heating and water vaporized into the gas.

The gaseous hydrocarbonaceous fuel feed stream at a temperature in the range of about ambient to 600° F. to and a pressure in the range of about 20 to 400 psia greater than that in the reaction zone of the partial oxidation gas generator, e.g., about 220 to 2900 psia, is introduced into a saturator vessel. As it passes up through the saturator vessel, the stream of gaseous hydrocarbonaceous fuel comes into direct contact with shift condensate in admixture with or without make-up water at a temperature in the range of about 250° F. to 500° F. passing down through the saturator vessel. Feed gas saturated with water e.g. containing about 5 to 60 volume % $H_2O$ leaves from the top of the saturator vessel at a temperature in the range of about 250° F. to 450° F., and is further heated to a temperature in the range of about 400° F. to 800° F. by indirect heat exchange with a portion, e.g., about 20 to 80 vol. %, of catalytically direct shifted process gas stream to be described further. Advantageously, by the subject process water heated by low level process heat replaces steam injection requiring more costly high level heat. Further, by the use of readily available shift condensate to saturate the gas stream by direct contact in the saturator, costs are minimized. No separate special water stream is required.

In one embodiment, the preheated saturated gaseous hydrocarbonaceous feedstream is introduced into a partial oxidation gas generator by way of the central passage of a two passage annular-type burner comprising a central conduit and a coaxial concentric annular-shaped passage. The passages are closed at the upstream end where the feedstreams enter and are open at the downstream ends where the feedstreams are discharged. At the downstream tip of the burner, the passages develop into concentric converging conical-shaped nozzles. The water saturated gaseous hydrocarbonaceous fuel is passed through the burner at a temperature in the range of about 400° F. to 800° F. The substantially pure oxygen gas is passed through the burner at a temperature in the range of about 120° F. to 900° F. The two feed streams emerging from the burner impact together, mix, and react by partial oxidation in the reaction zone of the gas generator to produce raw synthesis gas. In another embodiment, a three passage annular type burner is used comprising a central conduit, a coaxial concentric intermediate annular shaped passage, and a coaxial concentric outer annular shaped passage. Simultaneously, a substantially pure oxygen gas stream is passed through the central conduit, a stream of liquid hydrocarbonaceous fuel with or without admixture with steam is passed through the intermediate passage, and a stream of $H_2O$ saturated gaseous hydrocarbonaceous fuel is passed through the outer annular passage. The three streams impact each other at the burner tip, atomize, mix, and react by partial oxidation in the reaction zone of the gas generator.

The raw process gas stream exits from the reaction zone at a temperature in the range of about 1700° F. to 3500° F., and preferably 2000° F. to 2800° F., and at a pressure in the range of about 200 to 2500 psia, and preferably 700 to 1500 psia The composition of the hot-raw effluent gas stream is about as follows, in mole percent: $H_2$ 10 to 70, CO 15 to 60, $CO_2$ 0.1 to 25, $H_2O$ 0.1 to 25, $CH_4$ nil to 60, $NH_3$ nil to 5, $H_2S$ nil to 10, COS nil to 1.0, $N_2$ nil to 60, Ar nil to 2.0, HCN and HCOOH nil to 100 parts per million (weight basis). Particulate carbon is present in the range of about nil to 20 weight % (basis carbon content in the original feed). Ash and/or molten slag may be present respectively in the amounts of about nil to 5.0 and nil to 60 weight % of the original liquid hydrocarbonaceous or solid carbonaceous fuel feed.

In a preferred embodiment of the subject process all of the hot raw effluent fuel gas stream leaving the refractory lined, down flowing, noncatalytic, reaction zone of the partial oxidation gas generator at substantially the same temperature and pressure as in the reaction zone, less ordinary drop in the lines is directly introduced into a pool of water contained in the bottom of a quench drum or tank such as the one described in coassigned U.S. Pat. No. 2,896,927 which is herewith incorporated by reference.

The quench drum is located below the reaction zone of the gas generator, and the stream of raw fuel gas which it receives carries with it substantially all of the ash and/or slag and the particulate carbon soot leaving the reaction zone of the gas generator. The turbulent condition in the quench drum, caused by large volumes of gases bubbling up through the water helps the water to scrub much of the solids from the effluent gas. Large quantities of steam are generated within the quench vessel and saturate the gas stream. The stream of raw gas is cooled in the quench drum and leaves at a temperature in the range of about 300° F. to 600° F., such as about 450° F. to 550° F. and a pressure in the range of about 200 to 2500 psia, such as about 700 to 1500 psia. Advantageously, the fresh quench water used in the subject invention is a mixture of make-up water and shift condensate from the gas scrubber as produced subsequently in the process.

In order to prevent the plugging of downstream catalyst beds and/or the contaminating of liquid-solvent absorbents that may be used in subsequent gas purification steps, the cooled and partially cleaned process gas stream leaving the quench drum is further cleaned by contact with hot scrubbing water in another gas cleaning zone. This gas cleaning zone may include a conventional orifice such as shown and described in coassigned U.S. Pat. No. 3,524,630 which is incorporated herein by reference and conventional venturi scrubbers and sprays, along with a gas scrubbing chamber such as shown and described in coassigned U.S. Pat. No. 3,232,727, which is incorporated herein by reference. In the gas scrubbing chamber, the stream of raw fuel gas is scrubbed with scrubbing water comprising hot recycle shift condensate and make-up water as described herein. For example, in one embodiment the gas stream leaving the quench tank associated with the gasifier is scrubbed and intimately contacted with scrubbing water comprising shift condensate, in a venturi scrubber. In one embodiment, the scrubbing water comprises about 50 to 80 wt. % shift condensate and the remainder make-up water. However, the use of a venturi scrubber in the gas cleaning zone is optional. The process gas stream passes into and up through a pool of gas scrubbing water contained in the bottom of a gas scrubbing chamber. The scrubbed gas is then passed up through a packed section or trays in the upper portion of the scrubbing chamber where it is contacted by shift condensate and make-up water, i.e., scrubbing water flowing in a downward direction. Scrubbing water in the bottom of the gas scrubbing chamber may be recycled to a venturi scrubber, if there is one, and/or to the quench tank associated with the gasifier. By the gas cleaning procedure used in the subject process, the process gas stream is saturated with water and the amount of solid particles in the scrubbed fuel gas stream is reduced to a very low level such as less than about 10 parts per million (ppm), and preferably less than about 1 ppm.

The temperature of the saturated scrubbed clean process gas stream leaving the gas scrubber at a temperature in the range of about 300° F. to 600° F. is increased to a temperature in the range of about 500° F. to 700° F., such as about 575° F. to 625° F. This is done by passing the clean process gas stream in indirect heat exchange in a first heat exchanger, such as in a conventional shell and tube heat exchanger, with a portion, e.g., about 20 to 80 volume %, of the hot shifted process gas stream, leaving a conventional direct catalytic water-gas shift conversion zone at a temperature in the range of about 550° F. to 1050° F. such as 600° F. to 900° F. The remainder of the hot shifted process gas stream is used to preheat by indirect heat exchange in a second heat exchanger a stream of saturated gaseous hydrocarbonaceous fuel prior to said gas stream being introduced into the gas generator. The first and second heat exchangers may be connected in parallel or in series. A typical catalytic water-gas shift conversion zone is described in coassigned U.S. Pat. No. 4,052,176, which is incorporated herein by reference. In the water-gas shift conversion zone, CO and $H_2O$ in the process gas stream at a temperature in the range of about 500° F. to 1050° F. and at a pressure which is substantially the same as that in the reaction zone of the partial oxidation gas generator less ordinary pressure drop in the lines, e.g., a pressure drop of about 15 to 30 psia, react together while in contact with a conventional catalyst to produce $H_2$ and $CO_2$.

In the preferred embodiment wherein the aforesaid two indirect heat exchangers are connected in parallel, the two separate cooled portions of the shifted process gas stream leaving said first and second indirect heat exchangers are recombined to produce a process gas stream having a temperature in the range of about 400° F. to 600° F., such as about 500° F. In one embodiment with two indirect heat exchangers connected in series, all of the shifted process gas streams at a temperature in the range of about 550° F. to 1050° F. such as 600° F. to 900° F. is cooled to a temperature in the range of about 425° F. to 675° F. in a first indirect heat exchanger by heating the saturated process gas stream going into the water-gas shift conversion zone to a temperature in the range of about 500° F. to 700° F. All of the partially cooled process gas stream is then further cooled in the second indirect heat exchanger to a temperature in the range of about 400° F. to 600° F. by indirect heat exchange with a stream of saturated gaseous hydrocarbonaceous fuel on its way to the gas generator.

Heat and condensate from the shifted process gas stream and referred to herein as shift condensate are advantageously recovered in the low level heat recovery section of the subject process. The low level heat recovery section comprises from about 2 to 7, such as 3 indirect heat exchangers in series through which the process gas stream flows and is thereby cooled and cooling by direct contact with shift condensate which has been cooled in the feed gas saturator by water evaporation. A knock-out vessel for separating condensed water is located after each or at least the final heat exchanger. About 20–100 wt. % condensed water e.g. shift condensate which is collected in the knock-out vessels plus about 0–80 wt. % make-up water, such as boiler feed water (BFW) is pumped into the previously described gas scrubber at a temperature in the range of 100° F. to 500° F. and into the feed gas saturator at a temperature in the range of about 250° F. to 500° F. The coolant for at least one of the heat exchangers in the low level heat recovery section is boiler feed water at a temperature in the range of about ambient to 400° F., such as about 100° F. to 250° F. The BFW may be thereby heated by indirect heat exchange with the hot process gas stream to a temperature in the range of about 225° F. to 500° F. Medium pressure steam having a pressure in the range of about 150 to 1000 psia, such as about 200 to 750 psia, may be produced. Also, low pressure process steam having a pressure in the range of about 5 to 150 psia, such as about 30 to 50 psia, may be produced in one of the indirect heat exchangers. Low pressure steam may be used in the Acid Gas Recovery Unit (AGRU) for example as a stripping agent for solvent recovery, and in the Sulfur Recovery Unit (SRU). By the aforesaid multiple heat exchangers, the temperature of the process fuel gas stream may be reduced in the following steps: (1) 250° F. to 500° F., (2) 225° F. to 400° F., and (3) 80° F. to 120° F. Thus, in the subject process, low level heat from process cooling is efficiently used in a multiplicity of heat exchangers which provide the heat for (1) saturating the fuel gas, (2) producing medium and low pressure steam, and (3) producing hot water.

Hot water comprising about 20 to 100 wt. % shift condensate and any remainder comprising make-up water leaving from the bottom of the feed gas saturator at a temperature in the range of about 100° F. to 400° F. is introduced into the cooled process gas stream leaving the third indirect heat exchanger where BFW at a temperature in the range of about ambient to 400° F. is heated to medium pressure steam or hot boiler feed water at a temperature in the range of about 225° F. to 500° F.

The resulting mixture of process gas and saturator bottoms water at a temperature in the range of about 250° F. to 500° F. is mixed with a mixture comprising 20 to 100 wt. % shift condensate and the remainder, if any, comprising make-up water at a temperature in the range of about 100° F. to 300° F. By mixing the water with the process gas stream, the water is heated. The mixed stream of process gas, shift condensate, and make-up water containing about 10 to 70 mole % water and being at a temperature in the range of about 250° F. to 500° F. and below the dewpoint is introduced into a first knock-out pot where the portion of the water in the process gas stream that is liquid, e.g., 10 to 80 wt. %, is separated from the process gas stream. At least a portion, e.g., 10 to 100 wt. % of the water from the first knock-out vessel is sent to the feed gas saturator. Of the remainder, about 0 to 100 wt. % is mixed with the condensate from any subsequent heat exchangers and sent to the gas scrubber.

Next, in a fourth indirect heat exchanger, the process gas stream leaving said first knock-out vessel at a temperature in the range of about 250° F. to 500° F. is cooled to a temperature below the dewpoint by indirect heat exchange with BFW which enters said fourth heat exchanger at a temperature in the range of about 75° F. to 300° F. and leaves as low pressure steam at a temperature in the range of about 225° F. to 375° F. and a pressure in the range of about 5 to 150 psia. The process gas stream leaving the fourth heat exchanger at a temperature in the range of about 225° F. to 400° F. and containing about 3 to 50 mole % $H_2O$ is introduced into a second knock-out vessel. Shift condensate at a temperature in the range of about 225° F. to 400° F. is removed through a line at the bottom of the second knock-out vessel.

Next, in a fifth indirect heat exchanger, the process gas stream leaving said second knock-out vessel is cooled to a temperature below the dewpoint by indirect heat exchange with BFW or cooling water which enters said fifth heat exchanger at a temperature in the range of about 60° F. to 120° F. and leaves as hot water at a temperature in the range of about 80° F. to 300° F. The process gas stream leaving the fifth heat exchanger at a temperature in the range of about 80° F. to 120° F. and containing about 2 to 25% $H_2O$ is introduced into a third knock-out vessel. Shift condensate at a temperature in the range of about 80° F. to 120° F. is removed through a line at the bottom of the third knock-out vessel while process gas with 0.1 to 2.0 volume % $H_2O$ is removed through a line at the top of the vessel. A mixture of shift condensate and any make-up water from the bottom of knock-out vessels 1, 2, and 3 is recycled to the scrubber. Optionally, a portion, e.g., 0 to 80 wt. %, of said mixture may be mixed with the mixture of the process gas stream leaving the third heat exchanger and the water from the bottom of the saturator and introduced into the first knock-out vessel.

The process gas stream leaving the third or last knock-out vessel at a temperature in the range of about 80° F. to 120° F. may be purified by any suitable conventional system, for example, in an acid gas recovery zone (AGR) employing physical or chemical absorption with a liquid solvent, e.g., cold methanol, N-methyl-pyrrolidone, dimethyl ether of polyethylene glycol, and inhibited or uninhibited amine.

Acid gases, e.g., $CO_2$, $H_2S$, and COS are highly soluble in methanol at high pressures and low temperature. When the pressure is reduced and the temperature of the rich solvent raised, these gases may be readily stripped from the solvent. The $H_2S$ and COS may be concentrated into a fraction suitable for feeding a conventional Claus unit, i.e., Sulfur Recovery Unit (SRU) where elemental sulfur is produced.

In still another embodiment of the invention, significant advantages can be obtained by integrating the production of high pressure synthesis gas or syngas so that it can be used as a source of at least a portion of the reducing gas that is used at the lower mean operating pressure in the reduction reactor for the direct reduction of iron. The syngas produced from the partial oxidation reaction can then be expanded to lower its pressure to the mean operating pressure for the direct reduction of iron and thereby provide the reducing gas for the DRI reaction. The reducing gas is then contacted with feed material in the direct reduction reactor to effect reduction of the iron oxide therein to produce elemental iron.

This approach is contrary to conventional gasifier technology practice wherein the gasifier pressure is set to match the pressure of the downstream use. Because of the low mean operating pressure used in the DRI process, operating the gasifier at the same pressure would require larger and more expensive equipment. The gasifier would operate less efficiently at lower pressure, and removal of acid gases, such as $H_2S$ and $CO_2$ would be less efficient.

Preferably, before expansion of the syngas from the partial oxidation reaction to lower its pressure to produce the reducing gas at the mean operating gas pressure for the DRI reaction, the syngas mixture comprising $H_2$, CO, $CO_2$, $H_2O$, $N_2$, $H_2S$, COS and particulate carbon is partially cooled to about 200° F. to about 700° F., preferably to about 400° F. to about 500° F. and scrubbed to remove particulate materials. After further cooling to about 30° F. to about 150° F., preferably to about 100° F. to about 120° F., the syngas is scrubbed to remove its acid gas content. About 90% to about 100% of the $H_2S$ and COS are removed to prevent degradation of the iron in the DRI process. $CO_2$ is removed to the desired level for the DRI process, on the order of about 50% to about 100%, preferably about 90% to about 98%.

The cooled, scrubbed syngas is then expanded to lower its pressure and to produce power. Expansion is accomplished by a turbo expander which produces mechanical energy that can be used to drive an electrical generator and produce electrical power or used directly to power a compressor, pump, or other device requiring mechanical power. Prior to expanding the syngas to produce power, the syngas is preferably heated to about 300° F. to about 1200° F., preferably about 500° F. to about 900° F., in order to increase the power output of the expander which is approximately proportional to the absolute temperature of the inlet gas.

The high pressure synthesis gas can be treated to remove acid gases such as $CO_2$ and $H_2S$ by scrubbing or contacting with a solvent. The low pressure reducing gas that is fed to the DRI reduction reaction can include a recycle gas stream that exits the DRI reactor and is also treated to remove acid gases, primarily $CO_2$, by scrubbing with a solvent. The same solvent that is used to scrub and remove the acid gas content from the high pressure synthesis gas can also be used to remove acidic gases from the low pressure reducing gas. Therefore, acid gas removal for both the high pressure synthesis gas and the low pressure reducing gas can be advantageously effected in an integrated parallel or series circuit with respect to common stripper or regeneration means.

The synthesis gas can be water saturated and subjected to a shift reaction to vary the relative proportions of hydrogen and carbon monoxide. Typically, the desired $H_2$/CO ratio is between about 1.5 and 10.0 for the DRI process in order to control the heat balance within the DRI reactor. Higher $H_2$/CO ratios can also reduce the power requirements of the recycle compressor since the water produced from the iron reduction reaction with $H_2$ is condensed from the recycle gas prior to compression.

Preferably, the power generated by the syngas expansion and the heat generated by any cooling and shift reaction steps is utilized as a power and energy source in the plant which includes the DRI reduction reactor.

Advantageously, top gas from the reduction reactor is recycled to the DRI reactor as a reducing gas after treatment including compression, and the power generated by the expansion is directly utilized to drive the compression.

In another embodiment, the present invention combines the energy released from lowering the pressure of the syngas with the energy needs of the DRI recycle gas compressor thus eliminating the electrical generation/use inefficiencies and increasing energy efficiency for both processes and minimizing costs. This can be accomplished by determining the DRI recycle process needs and then operating the partial oxidation gasification at a sufficient pressure to meet and match the energy needs of the DRI recycle compressor. This invention can be quite efficient and cost effective with a single shaft configuration. In addition to increasing energy efficiency, much equipment can be eliminated including the recycle gas compressor electric motor drive, a portion of the electric substation, step up and step down transformers and other related infrastructure on the DRI side. On the gasification side, a generator and its associated equipment can be eliminated.

This invention also encompasses a direct reduction apparatus, comprising a direct reduction reactor configured for contacting reducing gas with feed material therein to effect reduction of the feed material to provide a reduced product. The DRI reaction system is designed to function under a mean operating gas pressure of about 1 to about 15 atmospheres. More specifically, a moving bed reactor preferably operates at about 1 to about 5 atmospheres and a fluidized bed reactor preferably operates at about 10 to about 15 atmospheres.

The inventive apparatus also includes means for partially oxidizing a hydrocarbonaceous feedstock to produce a synthesis gas which includes hydrogen and carbon monoxide at a pressure substantially greater than the mean operating gas pressure in the reduction reactor, means in communication with the gasifying means to receive the reducing gas and means to expand the reducing gas to lower its pressure to substantially the mean operating gas pressure in the reduction reactor, and means to feed the lower pressure reducing gas generated by the expansion means to the reactor as at least a portion of the reducing gas feedstock for the direct reduction reaction.

The apparatus can include further means to cool and scrub the synthesis gas and means to remove at least a portion of its acid gas content. Means are also preferably provided to reheat the scrubbed synthesis gas prior to its expansion.

The apparatus can further include means to recycle excess reducing gas from the reduction reactor system back to the reduction reactor system; compressor means to compress the recycle reducing gas; means to remove acid gases, primarily $CO_2$, from the recycle reducing gas; and means to directly couple the expansion means to the compressor means whereby all or part of the power generated by the expansion is directly utilized to drive the compressor means.

The acid gas removal means can employ the same solvent means to remove acid gases from the high pressure synthesis gas and from the low pressure reducing gas. Therefore, the acid gas removal means for both the high pressure synthesis gas and for the low pressure reducing gas can advantageously be incorporated in an integrated parallel or series circuit with respect to common stripper or regeneration means.

Preferably, the apparatus includes a shift reactor for subjecting the reducing gas mixture to a shift reaction to vary the relative proportions of hydrogen and carbon monoxide in the mixture.

Referring to FIG. 1, a free-flow noncatalytic refractory lined fuel gas generator 1 as previously described is equipped with axially aligned upstream flanged inlet port 2 and downstream flanged exit port 3. Annulus type burner 4, as previously described, with center conduit 5 in alignment with the axis of gas generator 1 is mounted in inlet port 2. A concentric coaxial annulus passage 6 is also provided.

A stream of substantially pure oxygen in line 7 is introduced by way of annular passage 6 of burner 4. A stream of water saturated gaseous hydrocarbonaceous fuel in line 8 is introduced by way of central passage 5. The two feedstreams impact together, mix, and react by partial oxidation in reaction zone 9 of gas generator 1. The hot stream of raw fuel gas comprising $H_2$, CO, $CO_2$, $H_2O$, $N_2$, A, $H_2S$, and COS passes down through dip tube 10 and is quench cooled in a pool of water contained in quench drum or tank 14 located at the bottom of gas generator 1. Quench water containing entrained particulate carbon is removed through line 15 and resolved in a carbon-recovery and water reclamation zone. Slag and particulate matter are periodically removed by way of exit port 3, line 16, valve 17, line 18, lockhopper 19, line 20, valve 21, and line 22.

The quenched raw process gas stream is passed through line 23 into gas scrubbing column 24 where it is scrubbed clean of entrained soot and particulate matter by scrubbing water comprising shift condensate and make-up water from line 25. By means of pump 26, water from the bottom of scrubbing column 24 is pumped through lines 27 and 28 and into quench tank 14. The clean raw process gas stream leaving gas scrubbing column 24 through line 29 is preheated in first heat exchanger 30 by indirect i.e. noncontact heat exchange with a first portion of subsequently produced shifted process gas stream. The first shifted process gas stream enters first heat exchanger 30 through line 35 and leaves at a reduced temperature through line 36. The preheated stream of hot raw process gas leaving first heat exchanger 30 leaves by line 37 and enters catalytic water-gas shift converter 38. CO and $H_2O$ in the raw process gas stream react together within said catalytic shift converter 38 to produce a shifted process gas stream comprising $H_2$-rich gas e.g. a gas comprising about 30 to 60 vol. % $H_2$ and 0 to 10 vol. % CO.

The hot shifted process gas stream leaving water-gas shift converter 38 is passed through line 39 and split into two streams. A first shifted process gas stream passes through line 35 and first indirect heat exchanger 30 as previously described. The remainder of the hot shifted process gas stream is passed through line 40, control valve 41, line 42, and second indirect heat exchanger 43 where it preheats a stream of saturated gaseous hydrocarbonaceous fuel from line 51. The gaseous hydrocarbonaceous fuel feed to the system in line 48 is saturated with water comprising shift condensate and make-up water from line 49 in saturating column 50. The stream of saturated gaseous hydrocarbonaceous fuel in line 51 is then preheated in second indirect heat exchanger 43, as previously described, and passed through line 8 and into central conduit 5 of burner 4, as previously described.

The stream of shifted process gas leaving first heat exchanger 30 by way of line 36 and the stream of shifted process gas stream leaving second heat exchanger 43 by way of line 44 are mixed together in line 52 and then passed through a low temperature cooling section comprising a plurality of indirect heat exchangers connected in series e.g. third heat exchanger 53, fourth heat exchanger 54, and fifth heat exchanger 55. In third heat exchanger 53, boiler feed water (BFW) from line 56 is converted into medium pressure steam or hot BFW which leaves third heat exchanger 53 by way of line 57. The stream of shifted process gas is cooled below the dew point in third heat exchanger 53 and then leaves by way of line 58. In line 59, the process gas stream from line 58 is mixed with water comprising shift condensate with or without make-up water from line 60 at the bottom of gas saturator 50.

In one embodiment, fresh make-up water is introduced into the system through line 46, valve 61, line 62 and is mixed in line 63 with a mixture of shift condensate and make-up water from line 64. By means of pump 65, a portion e.g. 0–80 wt. % of the mixture of shift condensate and make-up water in line 63 is pumped through lines 66 and 67, control valve 68, and line 69 into line 70 where it is mixed with the mixture of shifted process gas stream and shift condensate and make-up water from line 59. The remainder of the shift condensate and make-up water in line 66 is passed through line 93, valve 94, line 95, line 25 and into scrubbing column 24. In one embodiment with valve 61 closed, make-up water from a separate line may be introduced into lines 25 and/or 69. For example, with valve 96 open and valve 94 open or closed, make-up water from line 97 may be passed through line 98 into line 25.

The mixture of shifted process gas stream, shift condensate, and make-up water in line 70 is introduced into first knock-out vessel 71 where entrained liquid moisture comprising shift condensate and make-up water is separated and leaves through line 72. By mixing the water with the process gas stream, the water is heated. Dewatered process gas stream leaves through line 77, and is cooled to a temperature below the dew point in fourth indirect heat exchanger 54. The coolant is BFW which enters through line 78 and leaves as low pressure steam through line 79. The cooled process gas stream in line 80 is dewatered in knock-out vessel 81. A mixture comprising about 10 to 100 wt. % shift condensate and the remainder make-up water leaves through line 82 and is mixed in line 83 with the mixture comprising about 10 to 100 wt. % shift condensate and the remainder make-up water from lines 72, 73, control valve 74, and line 75. About 2 to 50 wt. % of the water in line 72 is passed through line 73, and the remainder is pumped through lines 84 and 49 into gas saturator 50 by means of pump 85.

The shifted process gas stream leaving the second knock-out vessel 81 is passed through line 86 into fifth indirect heat exchanger 55 where it is cooled to a temperature below the dew point by BFW coolant. The coolant enters heat exchanger 55 through line 87 and leaves as hot water through line 88. The process gas stream with entrained moisture in line 89 is passed into the third knock-out vessel 90 where condensed water comprising about 10 to 100 wt. % of shift condensate and the remainder comprising make-up water settles to the bottom and is removed through line 91. By means of the subject process, condensed water from the bottom of knock-out vessels 71, 81 and 90 in admixture with shift condensate and make-up water is recycled to the gaseous fuel saturator 50 and gas scrubber 24.

Dewatered hydrogen-rich gas is removed through line 92 and optionally purified to remove acid gases. The hydrogen-rich gas comprising about 40 to 100 mole % $H_2$ may be used as a reducing gas or as a hydrotreating gas.

Figure 2:
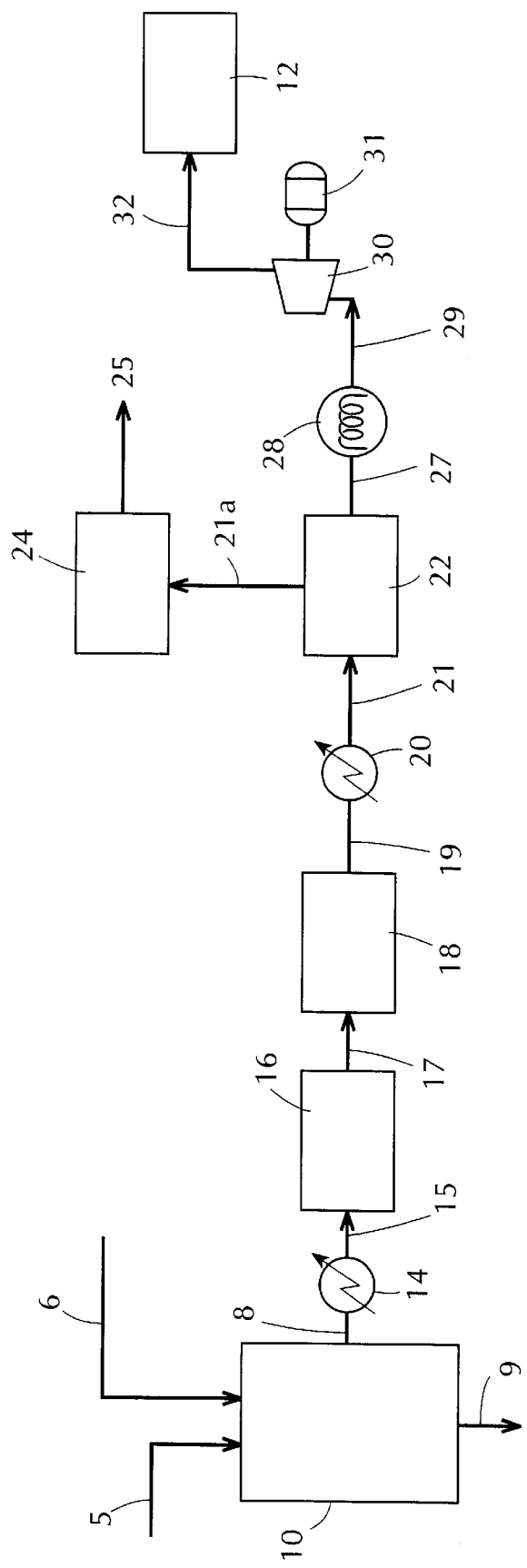
FIG. 2 is a simplified schematic drawing of a gasification process and a DRI process incorporating one embodiment of the invention.

Referring to FIG. 2, a hydrocarbonaceous feedstock 5 and air, oxygen, or an oxygen-enriched air stream 6 is fed in sufficient amounts into a partial oxidation gasifier 10 wherein the feedstock is converted into a synthesis gas 8, typically comprising a mixture of hydrogen, carbon monoxide, steam, carbon dioxide, and trace amounts of other partial oxidation products such as nitrogen, methane, hydrogen sulfide and carbonyl sulfide. The hydrogen to carbon monoxide ratio varies depending on the feedstock and the operating conditions of the gasifier, but typically ranges from about 0.5 to 3.0. The gasifier 10 is operated at an elevated pressure of about 20 to 150 atmospheres, which is well above the mean operating gas pressure used in the DRI reactor 12 wherein the reducing gas mixture 32 is fed after being treated and expanded to lower its pressure to the mean operating gas pressure used in the DRI reactor.

The feedstock 5 can comprise liquid and/or gaseous hydrocarbonaceous fuels and/or a pumpable slurry of solid carbonaceous fuel, and can be fed to the gasifier 10 in the form of a pumpable slurry or dry, depending on the gasifier used. Slag and/or ash 9 are recovered as a waste by-product.

Possible pumpable slurries include coal, particulate carbon, petroleum coke, concentrated sewer sludge, and mixtures thereof, in a vaporizable liquid carrier which can comprise water, liquid $CO_2$, liquid hydrocarbon fuel, and mixtures thereof. Liquid fuels can include liquefied petroleum gas, petroleum distillates and residue, gasoline, naphtha, kerosene, crude petroleum, asphalt, gas oil, residual oil, tar sand oil and shale oil, coal derived oil, aromatic hydrocarbons such as benzene, toluene, and xylene fractions, coal tar, cycle gas oil from fluid-catalytic-cracking operations, furfural extract of coker gas oil, and mixtures thereof.

Gaseous fuels can include vaporized liquid natural gas, refinery off-gas, $C_1$–$C_4$ hydrocarbonaceous gases, and waste carbon-containing gases from chemical processes. Other equivalent feedstocks can be used in each category.

The synthesis gas 8 exiting gasifier 10 is cooled in heat exchanger 14 to a temperature suitable for subsequent scrubbing and modification in a shift reactor. Alternately, it can be quenched with direct water injection into the syngas. This temperature can vary from about 200° F. to about 1200° F., and preferably about 400° F. to about 700° F. Heat exchanger 14 can be used to generate steam, which can be used in other parts of the process or to generate power.

The cooled and/or quenched synthesis gas 15 enters a scrubber 16 where it is scrubbed with water to remove solid particulates such as ash and unconverted carbon such as soot, and water soluble impurities such as ammonia, HCN, alkali metals, chlorides and the like. The syngas becomes saturated with water in the scrubber due to the intimate contact of the water and the syngas.

Gasifier 10 can be any appropriate choice from among the several commercial gasifiers available. A suitable gasifier is the Texaco quench gasifier, which is supplied as an integrated unit including the heat exchanger 14 and the scrubber 16.

The operating pressure of the gasifier 10 can vary from about 20 to 100 atmospheres, preferably about 25 to about 80 atmospheres, and would typically be an order of magnitude greater than the DRI process, for example between about 5 and about 20 times the mean operating gas pressure of the DRI process. The exact operating pressure of the gasifier is chosen by economic optimization of the configuration.

The scrubbed, saturated synthesis gas 17 can be fed, if desired, to a shift reactor 18 where the hydrogen to carbon monoxide ratio is altered to meet the requirements of the particular DRI process. The desired hydrogen to carbon monoxide ratio can vary considerably depending on the DRI technology employed, and typically varies from about 1.5:1 to pure hydrogen. The exothermic shift reaction converts water and carbon monoxide to hydrogen and carbon dioxide. Multiple bed shift reactors can be used with intermediate cooling of the gas between the reactor beds to increase the conversion of CO to $H_2$.

For a single bed reactor or the first reactor of a multiple bed reactor system, the "shifted" syngas stream 19 containing hydrogen and carbon monoxide exits shift reactor 18 at a temperature of about 550° F. to about 1100° F., preferably about 800° F. to about 950° F. For second and subsequent reactors of a multiple bed reactor system, the "shifted" syngas stream 19 containing hydrogen and carbon monoxide exits shift reactor 18 at a temperature of about 450° F. to about 750° F., preferably about 500° F. to about 650° F. The heat generated by the shifted syngas stream 19 is removed in heat exchanger 20 and used to generate steam for use in other parts of the process.

The cool, shifted synthesis gas stream 21 exits heat exchanger 20 and enters an acid gas removal system 22 where sulfur-containing compounds and carbon dioxide are removed. A number of acid gas removal systems are commercially available and selection will depend on the degree of sulfur compound and carbon dioxide removal required by the DRI process and the operating pressure of the acid gas removal system.

The acid gas stream 21a that is removed in the acid gas removal system 22 enters a sulfur recovery unit 24, wherein elemental sulfur 25 or sulfuric acid can be recovered by known means. The particular acid gas removal system 22 that is used will determine the required degree of cooling of the shifted synthesis acid that enters the acid gas removal system 22. The temperature of the acid-removed or "sweet" synthesis gas stream 27 exiting gas removal system 22 typically varies from about 30° F. to about 150° F. and preferably about 80° F. to about 120° F. The acid gas removal system 22 can be designed to expel or vent part or all of the $CO_2$ (not shown) separately from the $H_2S$ or both the $H_2S$ and $CO_2$ can be routed to the sulfur recovery unit 24.

After acid gas removal, the synthesis gas stream 27 is reheated via heat exchanger 28 to a temperature of about 300° F. to about 1500° F. The pressure of hot syngas stream 29 is then reduced via a gas expander 30 to the desired pressure for the DRI process. The amount of preheat in the exchanger 28 is determined by the required exit pressure and the power 31 generated in the expander 30. Typically, the temperature of syngas/reducing gas stream 32 exiting expander 30 is about 100° F. to about 500° F. and its pressure is about 0.5 to about 15 atmospheres. The syngas/reducing gas stream 32 is now at the mean operating pressure for the DRI process and constitutes the reducing gas feedstock.

Prior to entering the DRI process, the reducing gas 32 can be further heated, typically from about 800° F. to about 1500° F., to provide the desired operating temperature for the DRI process. The syngas 8 exiting the gasifier 10 has thus been converted into the reducing gas 32 entering the DRI process system 12. Therein, the reducing gas 32 reduces iron ore to metallic iron, typically by being passed counterflow to and in contact with the iron ore.

A number of DRI processes are commercially available, using either pellet or fines based iron ore feeds, and the present invention is considered applicable to these processes.

Figure 3:
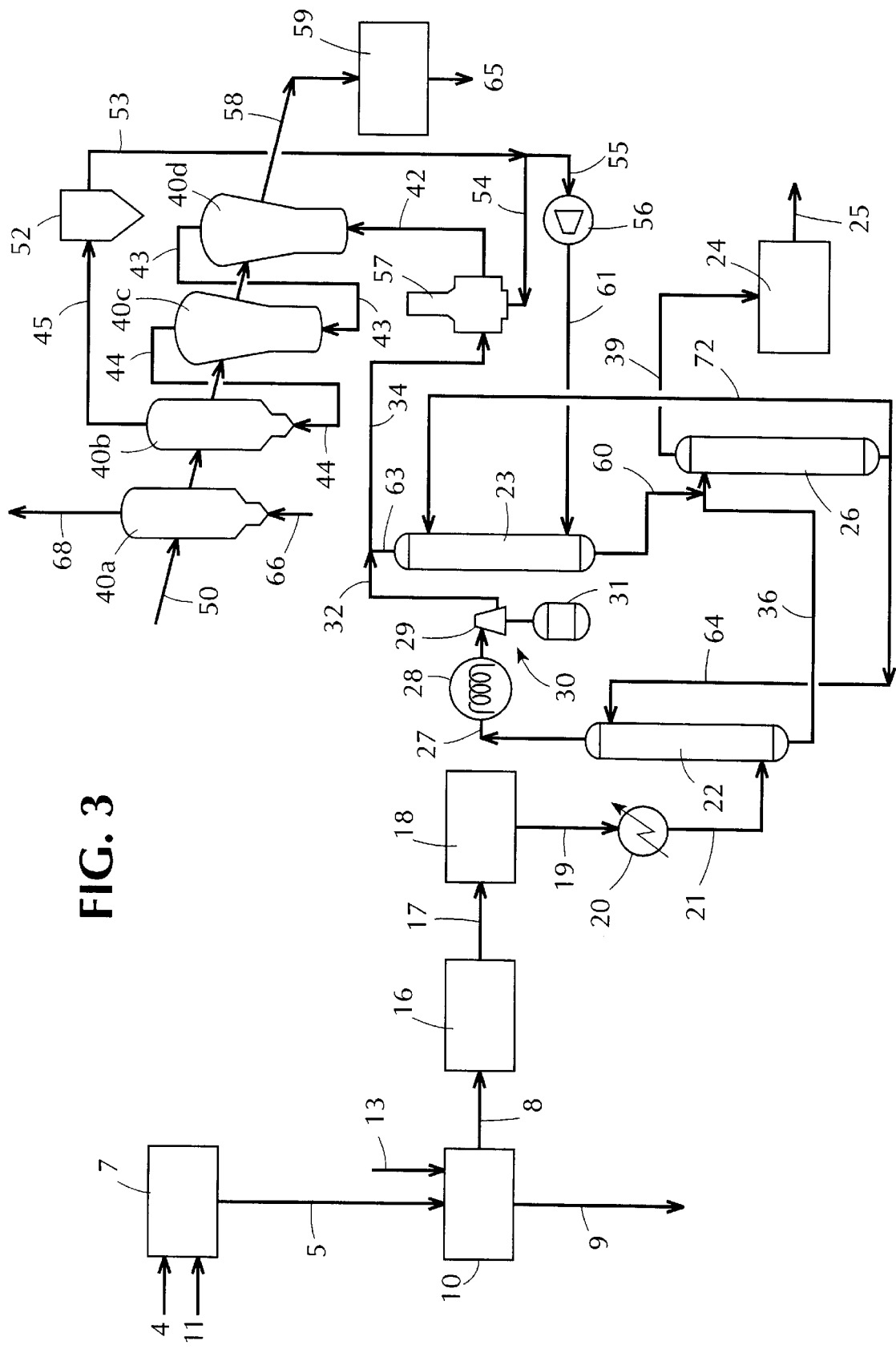
FIG. 3 is a simplified schematic drawing of a gasification process and a DRI process incorporating a second embodiment of the invention.

Referring now to FIG. 3, bulk coal 4 is ground in grinding mill 7 to form ground coal which is slurried with water 11 to form the hydrocarbonaceous slurry feedstock 5 which is pumped into the gasifier 10. The preferred gasifier is a down-flow quench gasifier integrated with the Fior process. Air, oxygen or oxygen enriched air stream 13 is fed co-currently with the slurry feedstock 5 into the gasifier 10, which is an entrained flow gasifier comprising a gasification zone and a quench zone and operates at about 50 atmospheres pressure. The reaction temperature in the gasification zone is about 1100° C. to about 1600° C. The hot syngas produced from the reaction in the gasification zone passes into the quench zone where it is quenched with water to remove slag 9 and to partially clean the syngas which is saturated with water and exits the quench zone of the gasifier 10 as stream 8 at about 250° C. and about 50 atmospheres pressure. The syngas stream 8 is water-scrubbed in soot scrubber 16, which removes substantially all entrained particulates, alkali metals, heavy metals, and chlorides.

The scrubbed, saturated syngas 17 then enters the shift reactor 18 where the $H_2$ to CO ratio is adjusted to above 6, as desired for the DRI reaction system. The shifted syngas stream 19 is cooled in heat exchanger 20 from about 450° C. to about 40° C. before exiting as syngas stream 21 which enters the high pressure acid gas absorber 22, wherein all or most of the $H_2S$ and $CO_2$ is removed from the syngas by a solvent.

The liquid solvent containing the acid gases is commonly referred to as "rich" solvent, and exits high pressure gas absorber 22 as liquid stream 36, and enters the $CO_2/H_2S$ stripper/regenerator plant 26 wherein the rich solvent is heated and stripped of $H_2S$ and $CO_2$ to produce lean solvent streams 64 and 72 and an overhead gas stream 39 containing $H_2S$ and $CO_2$. Stream 39 enters the sulfur recovery unit 24 which can be a Claus system, wherein the sulfur 25 is recovered in its elemental form.

The $H_2S$-free syngas stream 27 exits the high pressure gas absorber 22 with its acid gas content substantially removed and is commonly referred to as "sweet syngas." Sweet syngas stream 27 is reheated in heat exchanger 28 from about 40° C. to about 500° C. to form heated syngas stream 29 which enters gas expander 30 to generate power in power generator 31. Sweet syngas stream 32 exits gas expander 30 at a lower pressure of about 10–12 atmospheres, which is the mean operating gas pressure used in the DRI reactor train of the Fior process.

By way of example, for typical feed rates of 70–80 tonnes/hour coal, 60–70 tonnes/hour oxygen, and 250 tonnes/hour iron ore fines, a pressure change at expander 30 from about 50 atmospheres to about 10–12 atmospheres can produce about 10 megawatts of power.

Sweet syngas stream 32 is combined with recycle top gas stream 63 which exits low pressure acid gas absorber 23. The combined gas stream 34 is at the operating pressure of the DRI reactors and consequently constitutes the reducing gas stream 34. The reducing gas stream 34 enters reheater 57 where it is heated to a temperature of about 1200° F. and exits as heated reducing gas stream 42 which enters fluidized bed DRI reactor 40d.

The core component of the Fior plant is an inclined cascade of four fluidized bed DRI reactors 40a, 40b, 40c, and 40d. Iron ore fines 50 delivered to the uppermost reactor 40a pass successively down through the reactors. The first reactor 40a, is a preheater while the other three are reducing reactors. In reactors 40b, 40c and 40d, the fines pass against a counterflow of reducing gas 42 which metallizes the iron ore and also serves as the fluidizing gas for the fluidized beds.

The reducing gas 42 is delivered to the lowermost reactor 40d via a gas inlet plenum assembly (not shown) and exits as top gas 43 which enters reactor 40c as the reducing gas and exits as top gas 44 which enters reactor 40b as the reducing gas and exits as top gas 45 which enters scrubber 52. Within each of the three reducing reactors, there are multiple cyclones (not shown) for cleaning the top gas of fine iron dust, which is returned to the respective fluidized beds via diplegs (not shown).

In scrubber 52, particulate materials and water are removed from the top gas 45, which is cooled to about 100° F. and exits as cooled, clean, particulate-free top gas stream 53, which is split into clean top gas streams 54 and 55. Clean top gas stream 54 serves as the fuel for reheater 57 and can also be supplemented with natural gas as desired.

Clean top gas stream 55 enters compressor 56 where it is compressed to about 11 to about 14 atmospheres and exits as compressed top gas stream 61, which enters low pressure acid gas absorber 23, wherein its $CO_2$ content is reduced by about 10% to 100%, and preferably by about 60% to 95%. The $CO_2$-reduced gas exits the low pressure acid gas absorber 23 as stream 63 which is combined with reduced pressure sweet syngas stream 32 to form reducing gas stream 34, which enters reheater 57 where it is heated to form heated reducing gas stream 42 that enters reactor 40d.

In the uppermost pre-heater reactor 40a, natural gas 66 serves both as the fluidizing gas and as fuel. The effluent gas 68 exiting reactor 40a is separately scrubbed and treated (not shown). In an alternative arrangement, the top gas from reducing reactor 40b can be used as the fluidizing heating gas in the pre-heater reactor 40a.

The metallized iron product 58 exiting the lowermost reactor 40d is directed to a briquetting plant 59. The output is referred to as hot briquetted iron 65 or HBI. The space comprising the iron ore feed system (not shown), DRI reactors 40a to 40d, and the briquetting plant 59 is maintained sealed under a mean operating gas pressure of about 10–12 atmospheres to minimize reoxidation of the iron.

FIG. 3 also depicts an embodiment of the invention wherein acid gas removal from the higher pressure synthesis gas and the lower pressure recycle reducing gas is integrated. The high pressure acid gas absorber 22 and the low pressure acid gas absorber 23 each use a common solvent solution to remove acid gases, such as an amine or Selexol® (Union Carbide Co.), and such solvent circulates via the common $H_2S/CO_2$ stripper or solvent regenerator 26. The solvent solution absorbs and removes the acid gases which come into contact with it in the respective absorbers.

FIG. 3 depicts the simplest form of integration which is a parallel configuration wherein the liquid solvent stream 36 containing acid gases $CO_2$ and $H_2S$ exits high pressure absorber 22. At the same time, liquid solvent stream 60, also containing acid gases, primarily $CO_2$, exits low pressure absorber 23. Both streams 60 and 36 enter the $CO_2/H_2S$ stripper/regenerator 26 wherein the $CO_2$ and $H_2S$ is removed from the solvent, thereby regenerating the solvent to form a "lean solvent" exiting stripper/regenerator 26 which is divided into solvent streams 64 and 72.

Solvent stream 64 is recycled to high pressure absorber 22 for reuse, and solvent stream 72 is recycled to low pressure absorber 23 for reuse.

The stripped $CO_2$ and $H_2S$ gas stream 39 exits the top of stripper/regenerator 26 and enters sulfur recovery unit 24 wherein elemental sulfur 25 is recovered.

Figure 4:
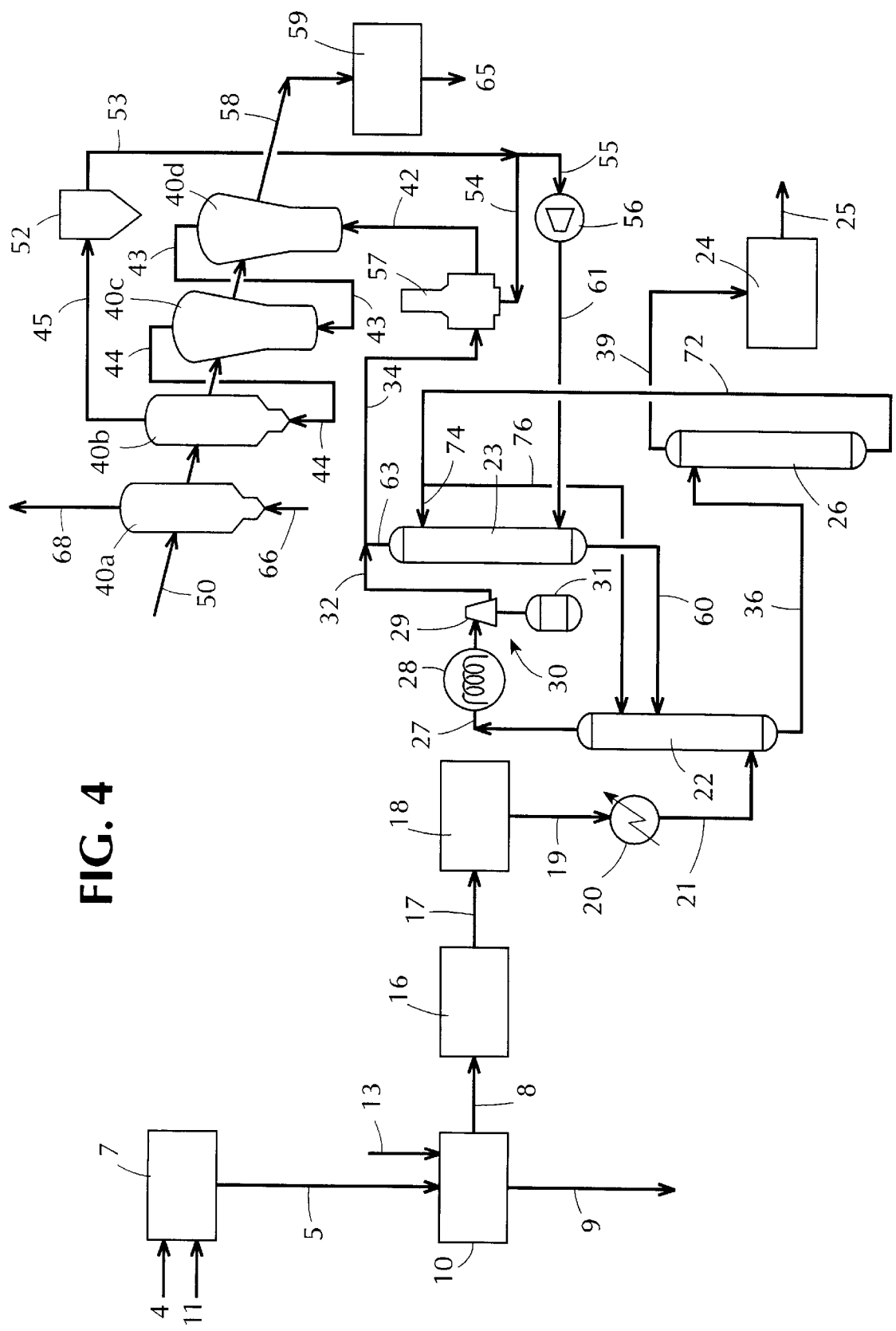
FIG. 4 is a simplified schematic drawing of a gasification process and a DRI process incorporating a third embodiment of the invention.

FIG. 4 is a variation of the process of FIG. 3 wherein the integrated removal of the acid gases is accomplished by means of a series configuration. Thus, only the liquid solvent stream 36 exiting the high pressure absorber 22 enters the $CO_2/H_2S$ stripper/regenerator 26. The regenerated lean solvent stream 72 exiting stripper/regenerator 26 is divided into streams 74 and 76. Solvent stream 74 enters the low pressure acid gas absorber 23 for reuse and solvent stream 76 enters high pressure acid gas absorber 22 for reuse. The liquid solvent stream 60 exiting low pressure acid gas absorber 23 is also directed to high pressure acid gas absorber 22 where the loading of the acid gas in the solvent can be increased due to the higher operating pressure of the high pressure gas absorber 22. The increased loading of $CO_2$ in the solvent stream 60 entering the high pressure absorber 22 reduces the required solvent circulation rate.

In a modification which achieves more efficient plant integration, the synthesis gas expander 30 can be directly coupled to the compressor 56 which compresses the recycled reducing gas from the DRI process. In this manner the power generator 31 or expander 30 can directly drive the compressor 56. Having the power output 31 of the expander 30 directly coupled to the recycle compressor 56 offers the advantages of eliminating the need for a generator on the expander side, and a motor on the compressor side, along with their associated electrical hookups as well as increasing the efficiency by avoiding the energy losses in converting mechanical power to electrical power and back to mechanical power.

Even if the expander and compressor loads do not match, many benefits can be realized. For the case of non-equal loads, a motor/generator could be attached on the shaft to allow power to be exported or imported as required. The motor/generator would still be much smaller than required by a non-coupled generator and motor and the efficiency can still be improved.

The syngas composition and pressure can be adjust to meet the needs of any of the current commercial DRI processes based on syngas production, including the HYL III, Midrex and Fior processes and other processes such as Finmet and Circored.

The present invention is adaptable to a variety of geographical and feedstock circumstances, and offers many operational advantages. By setting the gasifier pressure well above the mean operating gas pressure of the DRI reactor(s), an expander can be used to generate power for the plant. By optimizing the expander conditions, including the syngas reheat and acid gas removal systems, most or all of the power required can be generated to satisfy the needs of gas production and preparation, and/or the DRI plant.

What is claimed is:

1. In a partial oxidation process for partially oxidizing a hydrocarbonaceous feedstock to produce a high temperature, high pressure synthesis gas containing hydrogen and carbon monoxide, wherein said process comprises the partial oxidation of a hydrocarbonaceous feedstock to produce a synthesis gas at a high pressure, cooling and scrubbing the synthesis gas to produce a clean synthesis gas, heating the clean synthesis gas, reacting the heated synthesis gas in a shift reaction to increase the amount of hydrogen contained therein, cooling the hydrogen enriched synthesis gas and removing acid gases from the hydrogen enriched synthesis gas; the improvement which comprises:

integrating the partial oxidation process with a reaction system for the direct reduction of iron, wherein an ion ore feed is contacted with a reducing gas at a mean operating gas pressure to produce elemental iron, and wherein at least a portion of the reducing gas for the direct reduction of iron is supplied by the high pressure synthesis gas produced from the partial oxidation process, and wherein the synthesis gas has been expanded to lower its pressure to substantially the mean operating gas pressure used in the reaction for the direct reduction of iron, thereby utilizing at least a portion of the synthesis gas as the reducing gas for the direct reduction of iron.

2. The process of claim 1, wherein the expansion of the synthesis gas is used to produce power.

3. The process of claim 1, wherein the reducing gas feed to the direct reduction of iron reaction system includes a recycle gas stream that has exited the direct reduction of iron reaction system and wherein acidic gases have been removed from the recycle gas stream.

4. The process of claim 3, wherein the acidic gas removal from the synthesis gas and the acidic gas removal from the recycle gas exiting from the direct reduction of iron reaction system is effected in an integrated parallel or series circuit with respect to common stripper or regeneration means.

5. The process of claim 1, wherein power and heat is generated during the integrated process and said power and heat is recovered and utilized as power and heat sources for the integrated process.

6. The process of claim 2, wherein reducing gas exiting the direct reduction of iron reaction system is compressed to the mean operating gas pressure and recycled to the iron reduction reaction, and wherein the power generated by the expansion of the synthesis gas is directly utilized to power the compression of the reducing gas.

7. The process of claim 1, wherein all or substantially all the reducing gas required for the direct reduction of iron reaction system is supplied by the synthesis gas produced from the partial oxidation process.

\* \* \* \* \*

UNITED STATES PATENT AND TRADEMARK OFFICE
CERTIFICATE OF CORRECTION

PATENT NO : 6,033,456
DATED : March 7, 2000
INVENTOR(S): Frederick C. Jahnke

It is certified that error appears in the above-identified patent and that said Letters Patent is hereby corrected as shown below:

In Column 5, line 40, after "psia", insert --.--.

In Column 15, line 44, after "$CO_2$", insert --.--.

Signed and Sealed this

Thirteenth Day of March, 2001

*Attest:*

NICHOLAS P. GODICI

*Attesting Officer*   *Acting Director of the United States Patent and Trademark Office*